US008800018B2

(12) United States Patent
Sandhu et al.

(10) Patent No.: US 8,800,018 B2
(45) Date of Patent: *Aug. 5, 2014

(54) METHOD AND SYSTEM FOR VERIFYING USER INSTRUCTIONS

(71) Applicant: VMware, Inc., Palo Alto, CA (US)

(72) Inventors: Ravinderpal Sandhu, Oak Hill, VA (US); Ravi Ganesan, Half Moon Bay, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,235

(22) Filed: Nov. 19, 2012

(65) Prior Publication Data
US 2013/0167213 A1 Jun. 27, 2013

Related U.S. Application Data

(63) Continuation of application No. 11/652,616, filed on Jan. 12, 2007, now Pat. No. 8,332,921.

(51) Int. Cl.
*H04L 29/06* (2006.01)

(52) U.S. Cl.
CPC ............... *H04L 63/06* (2013.01); *H04L 63/08* (2013.01); *H04L 63/1441* (2013.01)
USPC ............................................................. 726/9

(58) Field of Classification Search
CPC .............................. H04L 9/3202; H04L 63/06
USPC ............................................................. 726/9
See application file for complete search history.

(56) References Cited

U.S. PATENT DOCUMENTS

| 5,588,061 | A | 12/1996 | Ganesan et al. | |
| 5,913,212 | A * | 6/1999 | Sutcliffe et al. | 1/1 |
| 6,598,032 | B1 | 7/2003 | Challener et al. | |
| 2003/0200265 | A1* | 10/2003 | Henry | 709/206 |
| 2004/0097217 | A1* | 5/2004 | McClain | 455/411 |
| 2006/0015631 | A1* | 1/2006 | Bregant-Belin et al. | 709/230 |
| 2008/0270019 | A1* | 10/2008 | Anderson et al. | 701/201 |

* cited by examiner

*Primary Examiner* — Jacob Lipman

(57) ABSTRACT

A method for verifying instructions communicated from a user to a relying entity is described. A trusted entity receives a request from the relying entity to verify instructions received from the user wherein the request includes verification information corresponding to the instructions communicated to the relying entity from the user. The trusted entity sends a request to the user to provide verification information corresponding to the instructions. The trusted entity receives the verification information from the user and compares it to the verification information received from the relying entity. The trusted entity then verifies the instructions based on the comparing.

16 Claims, 6 Drawing Sheets

METHOD AND SYSTEM FOR VERIFYING USER INSTRUCTIONS

CROSS REFERENCE TO RELATED APPLICATIONS

This application is a continuation of U.S. patent application Ser. No. 11/652,616, filed Jan. 12, 2007 and entitled "ENHANCED SECURITY FOR USER INSTRUCTIONS", the contents of which are incorporated herein in their entirety by reference.

This application is related to U.S. application Ser. No. 11/415,065, filed May 2, 2006, now issued as U.S. Pat. No. 7,840,993 on Nov. 23, 2010, and entitled "PROTECTING ONE-TIME-PASSWORDS AGAINST MAN-IN-THE-MIDDLE ATTACKS", which in turn claims priority on Provisional U.S. Application Ser. No. 60/677,408, filed May 4, 2005, and entitled "PROTECTING ONE TIME PASSWORDS AGAINST MITM ATTACKS", the contents of which are incorporated herein in their entirety by reference.

This application is also related to U.S. application Ser. No. 11/055,987, filed Feb. 14, 2005, and entitled "ARCHITECTURE FOR ASYMMETRIC CRYPTO-KEY STORAGE", U.S. application Ser. No. 11/055,986, filed Feb. 14, 2005, and entitled "TECHNIQUE FOR ASYMMETRIC CRYPTO-KEY GENERATION" (now U.S. Pat. No. 7,565,527, issued on Jul. 21, 2009), U.S. application Ser. No. 11/056,120, filed Feb. 14, 2005, and entitled "MULTIPLE FACTOR PRIVATE PORTION OF AN ASYMMETRIC KEY", (now issued as U.S. Pat. No. 7,630,493 on Dec. 8, 2009), U.S. application Ser. No. 11/055,988, filed Feb. 14, 2005, and entitled "AUTHENTICATION PROTOCOL USING A MULTI-FACTOR ASYMMETRIC KEY PAIR" (now U.S. Pat. No. 7,386,720, issued on Jun. 10, 2008), U.S. application Ser. No. 11/056,116, filed Feb. 14, 2005, and entitled "ROAMING UTILIZING AN ASYMMETRIC KEY PAIR", U.S. application Ser. No. 11/056,114, filed Feb. 14, 2005, and entitled "ASYMMETRIC KEY HAVING A KIOSK MODE", (now issued as U.S. Pat. No. 7,599,493 on Oct. 6, 2009), and U.S. application Ser. No. 11/056,115, filed Feb. 14, 2005, and entitled "TECHNIQUE FOR PROVIDING MULTIPLE LEVELS OF SECURITY", (now issued as U.S. Pat. No. 7,596,697 on Sep. 29, 2009), the contents of which are incorporated herein in their entirety by reference.

This application is also related to U.S. application Ser. No. 09/739,260, filed Dec. 19, 2000, and entitled "SYSTEM AND METHOD FOR CRYPTO-KEY GENERATION AND USE IN CRYPTOSYSTEM" (now U.S. Pat. No. 6,970,562, issued Nov. 29, 2005), U.S. application Ser. No. 10/849,818, filed May 21, 2004, and entitled "ONE TIME PASSWORD ENTRY TO ACCESS MULTIPLE NETWORK SITES" (now U.S. Pat. No. 7,055,032, issued May 30, 2006), which is a continuation of U.S. application Ser. No. 09/739,114, filed Dec. 19, 2000, (now abandoned) and U.S. application Ser. No. 09/739,260, filed Dec. 19, 2000, and entitled "SYSTEM AND METHOD FOR CRYPTO-KEY GENERATION AND USE IN CRYPTOSYSTEM" (now U.S. Pat. No. 6,970,562, issued Nov. 29, 2005), U.S. application Ser. No. 09/739,112, filed Dec. 19, 2000, and entitled "HIGH SECURITY CRYPTOSYSTEM" (now U.S. Pat. No. 6,940,980, issued Sep. 6, 2005), U.S. application Ser. No. 09/739,113, filed Dec. 19, 2000, and entitled "SECURE COMMUNICATIONS NETWORK WITH USER CONTROL OF AUTHENTICATED PERSONAL INFORMATION PROVIDED TO NETWORK ENTITIES" (now U.S. Pat. No. 7,017,041, issued Mar. 21, 2006), U.S. application Ser. No. 09/739,119, filed Dec. 19, 2000, and entitled "METHOD AND SYSTEM FOR AUTHORIZING GENERATION OF ASYMMETRIC CRYPTO KEYS" (now U.S. Pat. No. 7,149,310, issued Dec. 12, 2006, U.S. application Ser. No. 09/739,118, filed Dec. 19, 2000, and entitled "SYSTEM AND METHOD FOR AUTHENTICATION IN A CRYPTO SYSTEM UTILIZING SYMMETRIC AND ASYMMETRIC CRYPTO KEYS" (now U.S. Pat. No. 7,069,435, issued Jun. 27, 2006), and U.S. application Ser. No. 09/739,111, filed Dec. 19, 2000, and entitled "SYSTEM AND METHOD FOR GENERATION AND USE OF ASYMMETRIC CRYPTO KEYS EACH HAVING A PUBLIC PORTION AND MULTIPLE PRIVATE PORTIONS" (now U.S. Pat. No. 7,065,642, issued Jun. 20, 2006), the contents of which are incorporated herein in their entirety by reference.

TECHNICAL FIELD

This invention relates to network security, and more particularly to enhancing the security of communications over a network.

BACKGROUND ART

Today, computing devices are almost always interconnected via networks. These networks can be large closed networks, as within a corporation, or truly public networks, as with the Internet. A network itself might have hundreds, thousands or even millions of potential users. Consequently it is often required to restrict access to any given networked computer or service, or a part of a networked computer or service, to a subset of the users on the public or closed network. For instance, a brokerage might have a public website accessible to all, but would like to only give Ms. Alice Smith access to Ms. Alice Smith's brokerage account.

Access control is an old problem, tracing its roots to the earliest days of computers. Passwords were among the first techniques used, and to this day remain the most widely used, for protecting resources on a computer or service.

Multifactor Password Authentication

Multiple factor authentication exists as a potential solution to the problems inherent with single factor password authentication. In multiple factor password authentication, at least knowledge of, if not actual possession of, two or more factors, at least one of which comes from a password, must be shown for authentication to be complete. It should be understood that in multiple factor password authentication, each factor remains separate. That is, the factors are not combined. Further, the factors are not even concatenated. Several multiple factor authentication techniques exist, including one time password token techniques, password encrypted computer storage techniques, password secured smart card techniques, and split asymmetric key techniques.

One Time Password Token Techniques

In one time password token techniques, two passwords are utilized, one typically being a permanent password associated with the user, and the other being a temporary, one-time use, password generated by a password generator. The permanent password may be optional, and two temporary passwords may instead be used. The temporary password has a finite usable life, such as sixty seconds. At the end of the useable life, another temporary password is generated. An authenticating computer knows each usable password as well as its useable life, based upon algorithms well known to those of ordinary skill in the art. A user transmits both the permanent password (first factor) and a temporary password (second factor) to the authenticating computer which then verifies both passwords. If the passwords are transmitted in the clear, these token techniques are subject to man-in-the-middle (MITM) attacks. Often the passwords are transmitted over a SSL protected channel with server-side SSL (also known as one-way SSL) where the server has a certificate but the client does not. This situation is also vulnerable to MITM attacks. Full-fledged client-side SSL (also known as two-way SSL) where both the server and client have certificates is not vulnerable in this manner.

Split Asymmetric Key Techniques

With asymmetric key cryptography every user is associated with a private/public crypto-key pair, commonly referred to as d and e, which are related by special mathematical properties. These properties result in the following functionality: a message encrypted with one of the two keys can then only be decrypted with the other.

One of these keys for each user is made public and the other is kept private. Let us denote the former by e, and the latter by d. So Alice knows d.sub.alice, and everyone knows e.sub.alice. To send Alice the symmetric key K, Bob simply sends ciphertext C=Encrypt(K,e.sub.alice). Alice, and only Alice (since no one else knows d.sub.alice), can decrypt the ciphertext C to recover the message, i.e. Decrypt(C,d.sub.alice)=K. Now both Alice and Bob know K and can use it for encrypting subsequent messages using a symmetric key system. Why not simply encrypt the message itself with the asymmetric system? This is simply because in practice all known asymmetric systems are fairly inefficient, and while they are perfectly useful for encrypting short strings such as K, they are inefficient for large messages.

The above illustrates how asymmetric cryptography can solve the key distribution problem. Asymmetric cryptography can also be used to solve another important problem, that of digital signatures. To sign a message M, Alice encrypts it with her own private key to create S=Encrypt(M,d.sub.alice). She can then send (M,S) to the recipient who can then decrypt S with Alice's public key to generate M', i.e. M'=Decrypt(S, e.sub.alice). If M' M then the recipient has a valid signature as only someone who has d.sub.alice, by definition only Alice, can generate S, which can be decrypted with e.sub.alice to produce M. To convey the meaning of these cryptographic operations more clearly they are often written as S=Sign(M, d.sub.alice) and M'=Verify(S,e.sub.alice). It is worth noting that asymmetric key digital signatures provide non-repudiation in addition to the integrity and authentication achieved by symmetric key Message Authentication Codes (MACs). With MACs the verifier can compute the MAC for any message M of his choice, since the computation is based on a shared secret key. With digital signatures this is not possible since only the sender has knowledge of the sender's private key required to compute the signature. The verifier can only verify the signature, but not generate it. It will be recognized by those skilled in this art that there are numerous variations and elaborations of these basic cryptographic operations of symmetric key encryption, symmetric key MACs, asymmetric key encryption and asymmetric key signatures.

The RSA cryptosystem is one system that implements asymmetric cryptography as described above. In particular, the RSA cryptosystem allows the same private-public crypto-key pair to be used for encryption and for digital signatures. It should be noted that there are other asymmetric cryptosystems that implement encryption only e.g., ElGamal, or digital signature only, e.g., DSA. Technically the public key in RSA is a pair of numbers e, N and the private key is the pair of numbers d, N. When N is not relevant to the discussion, it is commonplace to refer only to the public key as e and the private key as d.

Finally, the above description does not answer the important question of how Bob gets Alice's public key e.sub.alice. The process for getting and storing the binding [Alice, e.sub.alice] which binds e.sub.alice to Alice is tricky. The most practical method appears to be to have the binding signed by a common trusted authority. Such a "certificate authority" (CA) can create CERT.sub.alice=Sign([Alice, e.sub.alice], d.sub.ca). Now CERT.sub.alice can be verified by anyone who knows the CA's public key e.sub.ca. So in essence, instead of everyone having to know everyone else's public key, everyone only need know a single public key, i.e. that of the CA. More elaborate schemes with multiple Certificate Authorities, sometimes having a hierarchical relationship, have also been proposed.

Asymmetric key cryptosystems have been around for a long time, but have found limited use. The primary reasons are twofold: (a) the private key d in most systems is long, which means that users cannot remember them, and they have to either be stored on every terminal a user uses, or carried around on smart cards or other media; and (b) the infrastructure for ensuring a certificate is valid, which is critical, is cumbersome to build, operate, and use. The first technique proposed to validate certificates was to send every recipient a list of all certificates that had been revoked. This clearly does not scale well to an environment with millions of users. A later technique proposed to validate certificates was to require that one inquire about the validity of a certificate on-line, which has its own associated problems.

Split Asymmetric Key Cryptography

A system based on split asymmetric key cryptography has been developed to solve these two issues, i.e. long private keys and certificate validity, among others. In this system the private key for Alice, i.e. d.sub.alice, is further split into two parts, a part d.sub.aa which Alice knows, and a part d.sub.as which is stored at a security server, where d.sub.aa*d.sub.as=d.sub.alicemod.phi.(N). To sign a message, Alice could perform a partial encryption to generate a partial signature, i.e. PS=Sign(M,d.sub.aa). Alice then sends the server PS which 'completes' the signature by performing S=Sign(PS,d.sub.as). This completed signature S is indistinguishable from one generated by the original private key, i.e. d.sub.alice, so the rest of the process works as previously described. However, d.sub.aa can be made short, which allows the user to remember it as a password, so this system is user friendly. Further, if the server is informed that a particular ID has been suspended or revoked, then it will cease to perform its part of the operation for that user, and consequently no further signatures can ever be performed. This provides for instant revocation in a simple, highly effective fashion. It will be recognized by those skilled in the art that a split private key can be used in a similar manner for decryption purposes, and that the partial signatures (or encryptions) may be performed in the reverse sequence, that is first by the security server and subsequently by the user's computer, or may even be performed concurrently in both places and then combined.

Authentication Using Split Key Asymmetric Cryptography and the Secure Socket Layer (SSL)

Let us return now to password based systems. Challenge-response systems solve the issue of having to send passwords in the clear across a network. If the authenticating computer and Alice share a secret password, P, then the authenticating computer can send her a new random challenge, R, at the time of login. Alice computes C=Encrypt(R,P) and sends back C. The authenticating computer computes Decrypt(C,P)=C'. If C=C', then the authenticating computer can trust that it is Alice at the other end. Note however that the authenticating computer had to store P.

A more elegant solution can be created using asymmetric cryptography. Now Alice has a private key $d.sub.alice$, or in a split private key system she has $d.sub.aa$. The authenticating computer challenges her to sign a new random challenge R. She signs the challenge, or in the split private key system she interacts with the security server to create the signature, and sends it back to the authenticating computer which uses her public key, retrieved from a certificate, to verify the signature. Observe that the authenticating computer does not have to know her private key, and that an eavesdropper observing the signature on R gains no knowledge of her private key.

Server Side SSL

The secure socket layer (SSL) system, which is widely used on the Internet, in effect implements a more elaborate version of exactly this protocol. SSL has two components, 'server side SSL' in which a server proves its identity by correctly decrypting a particular message during connection set-up. As browsers, such as Netscape and Microsoft Internet Explorer, come loaded with the public keys of various CAs, the browser can verify the certificate of the server and use the public key therein for encryption. This authenticates the server to the client, and also allows for the set-up of a session key K, which is used to encrypt and MAC all further communications. Server side SSL is widely used, as the complexity of managing certificates rests with system administrators of web sites who have the technical knowledge to perform this function.

Client Side SSL

The converse function in SSL, client side SSL, which lets a client authenticate herself to a server by means of a digital signature, is rarely used. This is because although the technical mechanism is much the same, it now requires users to manage certificates and, unless they use a split private key, long private keys, which has proven to be difficult. So in practice, most Internet web sites use server side SSL to authenticate themselves to the client, and to obtain a secure channel, and from then on use Userid, Password pairs to authenticate the client.

So far from disappearing, the use of passwords has increased dramatically. Passwords themselves are often dubbed as inherently "weak". This is inaccurate because, if they are used carefully, passwords can actually achieve "strong" security. As discussed above, passwords should not be sent over networks, and if possible should not be stored on the receiving computer. Instead, in a "strong" system, the user can be asked to prove knowledge of the password without actually revealing the password. Perhaps most critical is that passwords should not be vulnerable to dictionary attacks.

Vulnerability of Passwords to Phishing by Impostor Website and Man-in-the-Middle (MITM) Attacks As noted above, users are often required to submit their user IDs and passwords as credentials to a website, in order to authenticate themselves to the website. In such cases, an attacker who gains access to a user ID and associated password, can impersonate the user from the attacker's or any other terminal.

Impostor Website Attacks

In practice users often have no absolute guarantee that the website to which they submit these credentials, is in-fact the website with which the user intends to communicate. This is because, while the website might look and feel like the intended website, e.g. the website of an Internet Service Provider (ISP) or some well-known e-commerce website such as an on-line bank or merchant, it could in-fact actually be an imposter website which has been set-up by an attacker to have the look and feel of the real website of the entity with whom the user wishes to communicate. This type of attack is commonly referred to as a form of "phishing".

If a user submits her credentials to the imposter website, an attacker could then use the submitted credentials to gain access to the user's confidential information and take advantage of the user's relationship with the real website and perhaps even other websites with which the user has registered the same credentials. For example, an attacker gaining access to the user's credentials could potentially transfer securities or money from the user's brokerage or bank account, and/or purchase products or services via the user's merchant account.

There are many ways for an attacker to fool a user into providing her credentials to an imposter website. For example, an attacker can send out a large number of e-mails inviting the user to logon to a well-known e-commerce website, such as paypal.com, but having a link to the website paypai.com, hoping that the recipient of the e-mail is registered at the financial website paypal.com. The attacker intends to capitalize on the fact that, although the last letter in the link to the imposter website is 'i' rather than "l", this distinction will be overlooked by the user and the user will activate the link. The web pages provided by the imposter website paypai.com are then made to look like those at the real website paypal.com. Thus, the user, viewing the impostor website after activating the link, may have no reason to suspect that the website is not the real paypal.com website. The user may therefore submit the credentials she has registered with the real paypal.com website, e.g. the user's ID and password, to the imposter website in an attempt to login. At this point, the user's credentials are captured by the imposter website. The attacker can then login to the real paypal.com website using the user's ID and password, and authorize or revoke transactions associated with the user's account, potentially even moving money into an account controlled by the attacker.

Thus, not only can the attacker mislead the user into believing that a imposter website is authentic, the attacker can mislead a real website into believing that the attacker is authentic, by using the user's credentials, i.e. the user's user ID and password, to authenticate to the real website, resulting in the real website believing it is dealing with the user when in fact it is dealing with the attacker.

The attacker might alternatively provide the user a link containing what appears on the user's display monitor to be a URL of the real website, e.g. paypal.com, but is in-fact a link to an imposter website. For example, the user may see a link that reads "http://" appended to www.paypal.com.%sdafghdgk% . . . which appears to be a link to the real website paypal.com with a long list of parameters that extend off the end of the URL window in the user's browser. However, unseen by the user, is that this link actually terminates with " . . . @paypal.com". Thus when the user activates the link with a click of the user's mouse, the user is in-fact linked to the imposter website. The imposter website can then operate as above to obtain the user's credentials for the real website.

Man-In-The-Middle (MITM) Attacks

Although the use of an imposter website is a common means for an attacker to gain access to a user's user ID and password, these credentials can also be obtained by an attacker launching a man-in-the-middle (MITM) attack. For example, if the user's ID and password are stored on the user's terminal, an attacker may gain access to these credentials, from the user's own terminal Furthermore, a sophisticated attacker may be able to capture the user's ID and password during the transmission of these credentials to the intended website. In either case, the attacker can then present the user ID and password to a website to successfully authenticate the attacker to that website. This type of attack is also commonly referred to as a form of "phishing".

True Protection Against MITM and Impostor Website Attacks Using Multifactor Split Key Asymmetric Cryptography In order to have true protection against phishing, the authentication must be end to end and there must be nothing that an attacker can capture using either an MITM attack or imposter website that can be used by the attacker to demonstrate knowledge of the credentials required to impersonate the real user in subsequent authentications to a real website. Thus, for true protection against phishing attacks, even if the attacker persuades the user to divulge user credentials or otherwise gains access to user credentials, or gains access to the user's network device, the attacker will not be able to reuse the user's credentials or operate the user's device to impersonate the user.

Armored Credential Systems Using Multi-Factor Split Key Asymmetric Cryptography

A system has recently been developed which provides true protection against phishing attacks. More particularly, as disclosed in U.S. application Ser. No. 11/055,987, filed Feb. 14, 2005, and entitled "ARCHITECHTURE FOR ASYMMETRIC CRYPTO-KEY STORAGE", TriCipher, Inc, the assignee of all rights in the present application, has developed an asymmetric cryptosystem in which users are associated with an asymmetric crypto-key pair having a public key and a private key, at least one of which, e.g. the private key, is split into multiple key portions, e.g. multiple private key portions. As in the conventional split key asymmetric cryptosystems discussed above, each of the key portions can be applied to an original message separately or in sequence and the partial results combined to form a transformed, i.e. encrypted, message, and the other key, e.g. the public key, can be applied to the transformed message to verify authenticity of the message preferably by recovering the original message, which authenticates the user. Conversely a message transformed, i.e. encrypted, with the other key, e.g. the public key, can be decrypted by applying each of the split key portions, e.g. the private key portions, to the transformed message separately or in sequence and the partial results combined to decrypt the original message.

However, unlike the other split key asymmetric cryptosystems, the TriCipher system can generate at least one of the multiple key portions of the asymmetric crypto-key using one or more pieces of information, known as factors. For purposes of the following discussion, we will assume that the private key is split and that a first private key portion of the asymmetric crypto-key is generated using the one or more factors. If multiple factors are used, two, three, or even a greater number of factors can be used, as may be desired under the circumstances. In any event, each of the factors is under the control of a single entity. That is, a single entity has possession of, or free access to, each of the one or more factors. The system preferably uses the RSA algorithm and therefore whether three or more keys are used, the system can retain all the desirable security properties of the two key RSA system, while being stronger than conventional two key RSA systems in significant respects.

At the most basic level, sometimes referred to as single armoring, a portion of the split key is computed using only a single factor corresponding to the password. In single armored mode, the user is associated with a password that is input by the user and expanded using an encryption algorithm, preferably one complying with the PKCS5 IETF standard, to generate a factor. Because the password is expanded in accordance with an encryption algorithm to create the factor, the factor is sometime referred to as a 'hardened password'. In single armored mode the factor itself serves as the applicable portion of the split key. At the next level, sometimes referred to as double armoring, the split key is computed using both the factor corresponding to the password and another factor. At the final level, sometimes referred to as triple armoring, a portion of the split key is computed using the factor corresponding to the password, plus two other factors. In triple armor mode, each user is often associated with a password, and two additional asymmetric crypto-key pairs comprising the two additional factors.

In double armored and triple armored mode, knowledge of the password alone is insufficient for authentication, because additional factors are required for authentication. Furthermore, the authentication is end to end, and there is nothing that an attacker's website can capture which will give the attacker knowledge of all the credentials necessary for authentication because the protocols require the attacker to demonstrate possession of credentials that are not actually transmitted to the imposter website but are required to construct the cryptographic keys used to establish the credentials. Thus, even if the attacker is able to set up a website that looks like the intended website or launch a successful MITM attack, the attacker will at best only be able to obtain and demonstrate possession of the crypto-key credentials, but not the underlying credentials necessary to construct the applicable key, and therefore will not be able to successfully impersonate the user in subsequent authentications. Because of all this, double and triple armored mode can provide true phishing protection.

One-Time-Password Protection Against MITM and Impostor Website Attacks

A wide variety of one-time-password (OTP) techniques have been proposed to enhance protection against MITM and impostor website attacks. However, all of the proposed techniques have tended to have (i) a shared-secret between the user and the authenticating entity, (ii) a challenge that both entities agree on, (iii) a response which both entities compute independently using an identical process and the shared-secret, e.g. Process(challenge, shared secret)=>response, with this process having the property that an attacker cannot derive the shared-secret even if the attacker observes several pairs of (challenge, response), and that the challenge varies with each use and is never repeated, (iv) authentication which requires the user to simply type the correct response, i.e. the OTP, say into a web page that is presented on the display of the user's PC and is then transmitted to another entity, such as a sponsor or merchant represented by a server at a website, which in turn communicates the response from the user to the authenticating entity, e.g. a distinguished server, which in turn independently computes the correct response, i.e. the OTP, and if it matches with the response from the user, tells the other entity, e.g. the sponsor or merchant represented by the server at the sponsor or server website, that it is likely the user is authentic.

Conventional One-Time-Password Techniques

Exemplary characteristics of four common but different types of OTP techniques are described below.

In time-synchronous type OTP techniques, the shared secret is a large random number, such as a symmetric crypto-key. The challenge is the time at that instant, e.g. the time when authentication is requested. The user has a token, typically a physical device that computes a new response every minute based on Process (shared-secret, time). The technique works by requiring the user to type in the response, i.e. the OTP, currently displayed on the token, which is sent to the relying entity, which is depicted as a system, e.g. the sponsor or merchant server, which has to communicate the received response to the OTP authenticating entity, e.g. a distinguished server, which independently computes the response, and tells the relying entity if the response from the user is correct.

In challenge-response type OTP techniques, the shared secret is a large random number. The challenge is a number the OTP authenticating entity, e.g. the distinguished server, sends the user, preferably directly. The user has a token into which the user types in the challenge sent by the authenticating entity. The token computes a response based on the typed in challenge. The technique works by requiring the user to type in the computed response, i.e. the OTP, and send the computed response to the relying entity, e.g. the sponsor or merchant server, which communicates the received response to the authenticating entity, e.g. the distinguished server, which independently computes a response and tells the relying entity if the response from the user is correct.

In paper-based type OTP techniques, the shared secret is a grid of numbers. The challenge is a set of coordinates for one or more cells in the grid that the authenticating entity, e.g. the distinguished server, sends the user, preferably directly. The user has a paper with the grid of numbers and the authenticating entity also has a copy of the grid. The technique works by requiring the user to type in the numbers in the appropriate cell(s) corresponding to the set of coordinates in the received challenge, and sending the typed in the numbers, i.e. the OTP, as a response to the other entity, e.g. the sponsor or merchant server. The other entity has to communicate the received numbers to the authenticating entity, e.g. the distinguished server, which independently determines the numbers in the appropriate cell(s) corresponding to the set of coordinates from its copy of the grid and tells the other entity if the response is correct.

In OATH and OATH Standard type OTP techniques, the shared secret is again a large random number. The challenge is the value of a counter that is incremented with each use. The user has a token that computes a new response as needed based on Process (shared-secret, counter). The technique works by requiring the user to type in the response currently flashing on token and send the typed in response, i.e. the OTP, to the relying entity, e.g. the sponsor or merchant server. The relying entity communicates the received response to the authenticating entity, e.g. the distinguished server, which independently computes a response and tells the other entity if the response from the user is correct.

On the surface it appears that since the response, i.e. the OTP, changes with each use, that OTPs protect against phishing. However, the phisher does not really care about the password, the phisher wants access to the other entity's website. So the phisher could simply launch a MITM attack which lures the user to a web proxy and then proxy all traffic between the user and the intended website, e.g. the website of a sponsor server or a merchant server.

The phisher can then achieve one of three goals:

If the goal of the phisher is to log into a sponsor or merchant server, the phisher can store the session cookies as they pass through the proxy, copy the stored cookies to the phisher's own network device, e.g. the phisher's PC, and use the stored cookie's to log into a desired server, e.g. a sponsor or merchant server. Observe that this attack requires little sophistication. All that is required of the phisher is the ability to set up a web proxy and copy cookies.

If the goal is to hijack the session, the phisher need only change the proxy website slightly so that the user's 'logoff' message does not go through to the intended website, e.g. the website of a sponsor server or a merchant server, and then keep 'refreshing the session' to keep the cookies valid. The phisher can then, at leisure, exploit the hijacked session.

If the goal is to pervert certain transactions, for instance to change a user's order for stock ABC to an order for stock XYZ, phisher need only slightly change the proxy website in a different way and the user will dutifully provide the OTP needed to confirm the transaction! An actual attack of exactly this nature was written using a freeware proxy server and a few lines of PERL. And observe that this is completely automated.

Attacks that have already been reported make OTPs useless by themselves as a defense against phishing. To reiterate, such proxy-in-the-middle attacks are extremely simple and will certainly be likely to be used by a phisher targeting a bank or e-commerce site.

The key to preventing such attacks is to use authentication techniques that have the following two properties. First, the authentication technique must not reveal secrets. That is, the "secret" must never leave the user's PC, but rather some "proof" of the secret is sent to the authenticating entity. Second, the "proof" should be such that interference of a MITM will be detected by the authenticating entity, e.g. the distinguished server or the relying party.

Most genuine websites already use server side SSL to authenticate themselves to the user's browser and to set up an encrypted channel. Of course one major reason for phishing is that browser designs did not do a good job of using the server side SSL verification to convey to the user that (i) they are on a SSL-protected site, and (ii) which site they are on. All the browser vendors have already announced plans, and some have already implemented early plans, to improve this situation. Unfortunately this, in and of itself, will not suffice to quell phishing. There are two reasons for this. First, such awareness techniques still require the user to be alert, and in general the user's most likely to be phished are those who tend to be "unconscious and unaware". Second, most phishers to our knowledge currently do not obtain server side SSL certificates, and rely on the fact that the end user does not notice that they are not at a "protected site". However, obtaining a 'server side certificate' under the name of a company that "sounds like" the genuine company from one of the now very many "trusted" roots browsers ship with, is not likely to thwart a determined phisher.

So while better use of server side SSL certificates is welcome, it does not by itself resolve the issue, and client authentication is needed. In case this is not clear, it should be understood that even with server side SSL certificates it is possible for a phisher who obtains such a fake SSL server certificate to get the user to sign the SSL running hash between the user's browser and the phisher. However, this will be useless to the phisher in signing into the genuine website if client side SSL authentication is also used by the genuine website.

Proposed One-Time-Password Techniques Using Out-Of-Band Communications

The use of out-of-band communications has been proposed to enhance protection against MITM attacks in systems relying on one-time-passwords. Here the notion is that by using two separate communications channels, e.g. the browser-server connection via an Internet channel and an SMS cell phone or similar other connection via a telephone network channel, one can thwart a MITM attack because the phisher will find it more difficult to hijack two channels rather than just one channel. While such an approach would enhance protection, it may be attractive to only a narrow class of applications, and therefore lacks broad applicability. Further, while such an approach has the advantage of being 'non PC invasive', i.e. no client side software is required and hence it does not require a footprint on the user's network device, it is significantly 'human invasive', i.e. the high resistance to installing 'client software', which is a one time deployment event, would seem altogether overdone if replaced with a mechanism that creates an constant nuisance for the user over an ongoing period for every authentication.

Proposed One-Time-Password Techniques Using Legacy PKI

The use of the legacy two-key public key infrastructure (PKI) has also been proposed as having the capability to enhance protection against MITM attacks in systems relying on one-time-passwords. Legacy PKI, if used correctly, can prevent MITM attacks, and it has been suggested that OTPs can be safely transmitted within a secure channel created using legacy PKI. However, in addition to the other reasons, some of which have been noted above, that legacy PKI has failed to find widespread acceptance and use, even if legacy PKI were implemented in a way in which MITM attacks are prevented, it would remain vulnerable to problems on the back-end integration of the OTPs.

Proposed One-Time-Password Techniques Using a Password Protection Module (PPM)

Still another proposal has been offered by RSA Laboratories, the research center of RSA Security Inc. According to the proposal by RSA Labs, every application has an application specific identifier (ASI), e.g. a URL. The browser of the user network device, e.g. the user's PC, catches this identifier, and securely hands it to a password protection module (PPM) which, as understood, is located either outside the user network device operating system or in a very secure part of the operating system. This PPM queries the user for the OTP and hashes it with the ASI. The hash is then handed back by the PPM to the browser of the user network device, which in turn transmits the received hash to a relying entity which is depicted as a system, e.g. a sponsor or distinguished server. The relying entity then transmits the returned hash to the authenticating entity, depicted as a Proprietary RSA server. To validate the returned hash, the authenticating entity must execute proprietary software that independently calculates the hash based on a priori knowledge of the OTP and the ASI. If the hash received from the browser of the user's network device and the calculated hash are a match, then the user is authenticated.

The proposed technique certainly eliminates, at least at this time, the risk of any practical MITM attack, with the exception of a phisher installing software on the user network device that seeks to spoof the "hands it" process identified above. However, the keyword here is "practical". If the user's browser has the ability to reliably determine the real address, e.g. the real Universal Resource Locator (URL), of the website to which it is submitting the hashed-OTP, in other words if the URL of the MITM is exposed to the browser, and used to construct the hashed-OTP, then the hashed-OTP will be useless and will fail. This is because, if the URL of the MITM is exposed to the user's browser, the MITM will receive the OTP hashed with the MITM website's URL. Thus, if the MITM tries to use this hashed-OTP at the legitimate site, it will be rejected. However, even if at present it is likely that the user's browser will be able to reliably determine the real address of the website to which it is submitting the hashed-OTP, whether or not this will continue to be the case as MITM attacks become ever more sophisticated remains questionable.

On the other hand if the MITM can fool the user's browser into believing that the URL of the MITM website with which the browser is communicating is the URL of the legitimate website to which the browser desires to communicate then the hashed-OTP will be useful at the real site and MITM attack will succeed. This is because, if the URL of the MITM is not exposed to the user's browser, the MITM will receive the OTP hashed with the intended website's URL. Thus, if the MITM uses this hashed-OTP at the legitimate site, it will be accepted.

For example, some of the techniques used in MITM attacks that attempt to grab a raw OTP, i.e. a non-hashed OTP, will typically reveal the URL of the MITM website to the user's browser. These techniques rely on the user not recognizing the rogue URL of the MITM. Other techniques used in MITM attacks tamper with the Domain Name System (DNS) and IP routing infrastructure, and seek to misdirect the user's browser to the MITM website, but with the same URL as the intended legitimate website. So hashed-OTPs will foil some MITM attacks but not others. While the attacks which cannot be foiled using RSA's PPM may be deemed impractical at this time, such attacks are, at least in theory, possible and could become much more likely to be used by phishers in the future. Thus, while the hashed-OTPs used in the proposed RSA PPM will raise the bar, these hashed-OTPs, will not necessarily protect against all MITM attacks.

Furthermore, while the ASI emulates, to some extent, the functionality present in SSL to prevent man in the middle, it cannot fully protect against all types of MITM attacks. Furthermore, while the protected area on the user's network device is certainly something that any mechanism can take advantage of, why RSA's proposed PPM should do hashing of the OTP instead of digital signing is not clear. Further still, the RSA PPM requires added instructions on the user network device, i.e. requires a footprint on the user network device, which puts it on par with any other solutions that thereby tend to be unacceptable to users and/or sponsors. Indeed, the technique requires fundamental changes to the commercially available web browser commonly installed on today's user network devices. Additionally, the technique also requires changes to the authenticating entity network station. Additionally, the proposed RSA PPM does nothing about addressing the back-end risk of password files being stolen or the theft of OTP secrets from insecure software. Although such back-end attacks are rarer than garden variety phishing, they are catastrophic when they are successful because all user credentials are compromised. Finally, since the proposed RSA PPM requires that the hash be different for each application, e.g. one hash is used to access the user's brokerage account and a different hash is used to access the user's bank account, the PPM makes single sign-on more difficult.

In summary, hashing a OTP using the PPM proposed by RSA Labs, requires the execution of a new proprietary browser interface on the user's network device, e.g. a user's PC, and therefore requires a change to existing browser standards, such as CAPI/PKCS11. The RSA proposal also requires the execution of new proprietary software by the authenticating entity station, e.g. a sponsor or distinguished entity server, rather then utilizing existing SSL software. The proposed system is also subject to catastrophic back end risks, and requires a change in the conventional OTP processing in order to hash the OTP with an ASI.

Proposed One-Time-Password Techniques Using a Protected OTPs

To address deficiencies in the RSA Labs' proposed OTP hashing technique using a PPM and the other proposed enhancements to conventional OTP techniques, the above-identified related application discloses a one-time-password authentication technique with enhanced protection against MITM attacks. The application describes a technique in which a secure communication tunnel is established between the authenticating entity and the user for communication of the OTP. Using this technique, a user of a communications network, such as the Internet or other network, can be securely authenticated based on a one-time-password (OTP).

The technique utilizes a user's associated private/public asymmetric crypto-key pair d, e, which could be an RSA or some other type asymmetric crypto-key pair, to secure the communication of the OTP. More particularly, in one exemplary implementation the user's private key d is split into a first private key portion d1 and a second private key portion d2. The user partially signs a symmetric session key K with the first private key portion d1 to form a first message M1, i.e. M1=sign [K, d1]. The authenticating entity receives the partially signed symmetric session key in message M1 from the user via the network. The authenticating entity completes the signature on the received partially signed symmetric session key with the second private key portion d2 to recover the symmetric session key, i.e. sign [M1, d2]=K. It will be understood that completion of a signature may also require the application of the public key e, if the public key e was not applied by the user in forming the partial signature. Furthermore, completion of a signature could additionally require the application of the other portions of the private key d, if the private key is split into more than portions d1 and d2, and any other such portion was not applied in forming the partial signature.

The user encrypts a OTP with the symmetric session key to form a second message M2, which is sometimes referred to as a protected one-time-password (POTP), i.e. M2=POTP=encrypt [OTP,K]. Stated another way, a protected secure tunnel for communicating the OTP is established by encrypting the OTP with the symmetric session key. The authenticating entity receives the message M2 with the encrypted OTP, from the user via the network, i.e. receives the OTP via the secure tunnel, and decrypts the received encrypted OTP with the recovered symmetric session key, i.e. decrypt [M2,K]=OTP. The user is then authenticated based on the decrypted OTP.

The user can also be authenticated based on the recovery of the symmetric session key by the authenticating entity. If so, there will be multiple levels of user authentication. That is, at one level the user is authenticated by proving knowledge of the private key portion d1, i.e. knowledge of the user portion of the split private key, while at another level the user is authenticated by proving knowledge of the OTP. The authenticating entity can also partially sign the recovered symmetric session key with the second private key portion d2 to form a third message M3, which is received by the user from the authenticating entity via the network, M3=sign [K,d2]. In such a case, the user can complete the signature on the received partially signed symmetric session key in message M3 with the first private key portion d1 to recover the symmetric session key, and authenticate the authenticating entity based on the recovery of the symmetric session key, i.e. sign [M3, d2]=K.

Typically, only after the user is authenticated based on the decrypted OTP, will the authenticating entity partially sign a relying party authenticating message (RPAM) with the second private key portion d2, i.e. the authenticating entity portion of the split private key, to form an partially signed authentication message (PSAM), i.e. PSAM=sign [RPAM, d2]. The RPAM is the message sought by the relying party, e.g. a merchant, to prove to the relying party that this is in fact the user and not an imposter. The RPAM could, for example, take the form of a secure socket layer (SSL) hash, e.g. client side SSL hash of prior messages communicated between the user and the relying party. The user receives the partially signed RPAM in message PSAM from the authenticating entity, e.g. a sponsor or distinguished entity, via the network. The user further signs the received partially signed relying party authenticating message with the first private key portion d1, which as previously noted is the user portion of the split private key, and transmits a further signed authenticating message (FSAM), with the further signed RPAM to the relying party via the network, i.e. FSAM=sign [PSAM, d1]. The RPAM is recoverable by the relying party by applying the public key e to the FSAM, i.e. sign [FSAM,e]=RPAM. Hence, the relying party can recover the relying party authenticating message RPAM with the user's public key in order to confirm that the user has been authenticated by the trusted authenticating entity.

The Continued Threat from Phishers, Pharmers, Browser Malware, Browser Trojan Horses and the Like While the techniques described above can be used to provide enhanced authentication security, attackers continue to develop new and more sophisticated attacks. More recently, there has been increased concern relating to pharming attacks and other types of attacks that may result in domain name system (DNS) poisoning.

While in phishing attacks the attacker will send an email that appears to come from a well known, trustworthy website, in order to convince the user to go to the imposter site and enter personal, financial or other sensitive information that the perpetrators can exploit for personal gain. On the other hand, in pharming the attacker installs malicious code, sometimes referred to as malware, or Trojan horses, on a PC or server, which will misdirect the unsuspecting Internet user to a fraudulent website, which then ask the user to enter personal, financial or other sensitive information (see for example, "Hackers get to the root of the problem" by Dan Geer. IEEE Computer, May 2006, Page(s): 17-19). The pharming results in DNS poisoning. That is, while the URL being displayed in by the browser window on the user's network device appears to be perfectly proper, unbeknownst to the user, the displayed URL is mapped to fraudulent website's Internet Protocol (IP) address. This results in the unsuspecting Internet user being misdirected to the fraudulent website, which then asks the user to enter personal, financial or other sensitive information.

There can be little doubt that network communications will, in the future, be subject to still other types of attacks and attackers, which are not now even being contemplated.

Accordingly, there remains a need for further enhanced security for communications over a network, in order to protect against attacks, such as those launched by phishers and pharmers, browser malware, Trojan horses, domain name poisoning and the like.

OBJECTIVES OF THE INVENTION

It is an object of the present invention to enhance security of communications over a network. Additional objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with aspects of a networked system implementation of the invention, a first network station is associated with a user, a second network station is associated with a relying entity, e.g. a merchant or bank etc., and a third network station is associated with a trusted entity, such as an authenticating entity. The network could be the Internet or some other public or private network. Each network station must be capable of communicating over the network, and may include any type of network compatible device(s). For example, a station may be represented by a PC or network server or a portable network device, such as a mobile phone or PDA, that is configured with the logic needed to perform the required functions.

The first network station is configured to transmit a user instruction to a relying entity over the network via a first communication channel, or what could also be characterized as a first communication link. The user instruction could be of any type. For example, the instruction might be an instruction to transfer money to or from a bank account, buy or sell securities, change a password or user ID, or an instruction of some other type. The first channel may be a secure channel, i.e. one in which all communications are authenticated and/or encrypted with a symmetric or other type session key, or could be an insecure channel, which is the case today with many communications channels established over Internet.

Either the first network station is further configured to transmit verification information corresponding to the user instruction and which may be the user instruction itself, to the trusted entity over the network via a second, preferably secure, communication channel, or the second network station is configured to transmit the verification information to the trusted entity via a third, preferably secure, communication channel, or both. The third communications channel may be a channel over the network, but could alternatively be a channel over a different network or a non-network channel. For example, if the trusted entity serves only the relying entity to whom the user instruction is transmitted, the third communications channel might be a channel on another network or a non-network communications channel. On the other hand, if the trusted entity serves many different relying entities, the third communications channel might be a channel on the same network, e.g. the Internet, as that over which the user instruction was transmitted to the relying entity.

If the first network station is further configured to transmit the verification information, in one alternative the third network station is configured to further transmit the transmitted verification information to the relying entity via the third communication channel and the second network station is further configured to verify the transmitted user instruction based on the further transmitted verification information. Verification may be performed in various ways, such as by a comparing the transmitted user instruction with the further transmitted verification information. It will be noted that in this alternative the second network station need not be configured to transmit verification information to the third network station.

In another alternative, the second network station is also configured to transmit verification information corresponding to the user instruction it received, and which could be that user instruction itself, to the trusted entity via the third communication channel, and the third network station is further configured to verify the verification information transmitted by the second network station, and thereby verify the user instruction received by the second network station, based on the verification information transmitted by the second network station.

In another alternative, if the second network station is configured to transmit the verification information, but the first station is not so configured, the third network station is further configured to further transmit the transmitted verification information to the user over the network via the second communications channel and the first network station is further configured to verify the transmitted user instruction based on the further transmitted verification information. Verification by the first network station could, for example, include displaying the further transmitted verification information, such as on a display monitor, and receiving an input of the user, e.g. via a keyboard or mouse, that validates the displayed verification information.

Thus, depending on the implementation the user instruction received by the relying entity can be verified by the user, trusted entity or relying entity itself base on verification information transmitted by the user and/or the relying entity.

According to other optional aspects of the invention, if the transmitted user instruction is verified by the first network station, the first network station is further configured to transmit a verification notice to the trusted entity over the network via the second communication channel. The verification notice could be any type of notice indicating that the user instruction received by the second network station is valid, e.g. has been verified. In such a case, the third network station is further configured to further transmit the transmitted verification notice to the relying entity via the third communication channel. However, if the transmitted user instruction cannot be verified by the first network station, the first network station may be further configured to transmit a non-verification notice to the trusted entity over the network via the second communication channel, and the third network station is further configured to further transmit the transmitted non-verification notice to the relying entity via the third communication channel. The non-verification notice could also be any type of notice indicating that the user instruction received by the second network station is invalid, e.g. has not been verified.

On the other hand, if the user instruction received by the relying party is verified by the third network station, the third network station can be further configured to transmit a verification notice to the relying entity via the third communication channel. However, if it cannot be verified by the third network station, the third network station can be further configured to transmit a non-verification notice to the relying entity via the third communication channel.

According to still other optional aspects of the invention, the user may have an associated asymmetric crypto-key pair, e.g. an RSA or other type asymmetric crypto-key pair, including a private key d and a public key e, with the private key d split into a first private key portion d1 and a second private key portion d2. In such a case, if the first network station is further configured to transmit the verification information to the trusted entity, the first network station can be further configured to sign the verification information with the first private key portion d1, and the transmitted verification information will be the signed verification information. Alternatively, if the third network station is further configured to further transmit verification information it received from the relying party to the user, the third network station can be further configured to sign the verification information received from the relying party with the second private key portion d2, and the further transmitted verification information will be the signed verification information.

In accordance with aspects of a system, e.g. server, implementation of the invention capable of verifying a user instruction communicated over a communications network, such as the Internet, via a first communication channel to a relying entity, e.g. a merchant or bank, etc., one of one or more communications interface included in the system is configured with the hardware and necessary logic, such as programmed software instructions or some other form of logic, to receive verification information corresponding to the user instruction either from the user over the network, e.g. the Internet, via a second, preferably secure, communication channel or from the relying entity via the third, preferably secure, communication channel, which as noted above may or may not be a communication channel on the network over which the user instruction is transmitted to the relying entity. Each communication interface includes an I/O port and may also include a modem, such as a telephone, cable or satellite modem.

A processor is configured with the hardware and necessary logic, such as programmed software instructions or some other form of logic, to function in the manner described below. The processor could, for example, be a central processing unit of a computer, such as a personal computer (PC) or network server, or a processor of a mobile telephone, personal digital assistant (PDA) or other network compatible device.

If the verification information is received from the user, the processor may be configured to direct transmission of the received verification information to the relying entity, and one of the one or more communications interface is further configured to transmit the received verification information via the third communication channel in accordance with the processor directive. Alternatively, one of the one or more communications interface may be further configured to also receive verification information from the relying entity via the third communication channel, and the processor is configure to verify the verification information received from the relying entity based on the verification information received from the user.

It should be understood that if the third communications channel is also a network communications channel, only a single communications interface may be required to transmit and receive communications via both the second and third communication channels. However, if the third communication channel is on a different network or is a non-network communication channel, then it may be necessary to have two different interfaces, one of which is used for transmitting and receiving communications via the second communication channel and another of which is used for transmitting and receiving communications via the third communication channel.

If the verification information is received from the relying entity, but not from the user, the processor is configured to direct transmission of the received verification information to the user, and one of the one or more communications interface is further configured to transmit the received verification information over the network via the second communication channel in accordance with the processor directive.

Optionally, if the received verification information is directed to be transmitted to the user, one of the one or more communications interface is further configured to receive a verification or a non-verification notice from the user over the network via the second communication channel. In such a case, the processor is further configured to direct transmission of the received verification or non-verification notice to the relying entity, and one of the at least one communications interface is further configured to transmit the received verification or non-verification notice via the third communication channel in accordance with the processor directive.

Alternatively, if the validation information is received from both the user and the relying party, and the processor is able to verify the user instruction, the processor may be further configured to direct transmission of a verification notice to the relying entity, and one of the one or more communications interface can be further configured to transmit the verification notice via the third communication channel in accordance with the processor directive. However, if the processor is unable to verify the user instruction, the processor may be further configured to direct transmission of a non-verification notice to the relying entity, and one of the one or more communications interface can be further configured to transmit the non-verification notice via the third communication channel in accordance with the processor directive.

According to other optional aspects of the system implementation, as noted above the user may have an associated asymmetric crypto-key pair including a private key d and a public key e, with the private key d split into a first private key portion d1 and a second private key portion d2. In such a case, if the verification information is received from the user, the processor may optionally be further configured to apply the second private key portion d2 to the received verification information to recover the verification information. Alternatively, if the verification information is received from the relying entity and transmitted to the user, the processor may be further configured to sign the received verification information with the second private key portion d2 prior to transmitting it to the user. In such a case, the verification information transmitted to the user is the signed verification information.

PREFERRED EMBODIMENT(S) OF THE INVENTION

The Network Architecture

Figure 1:
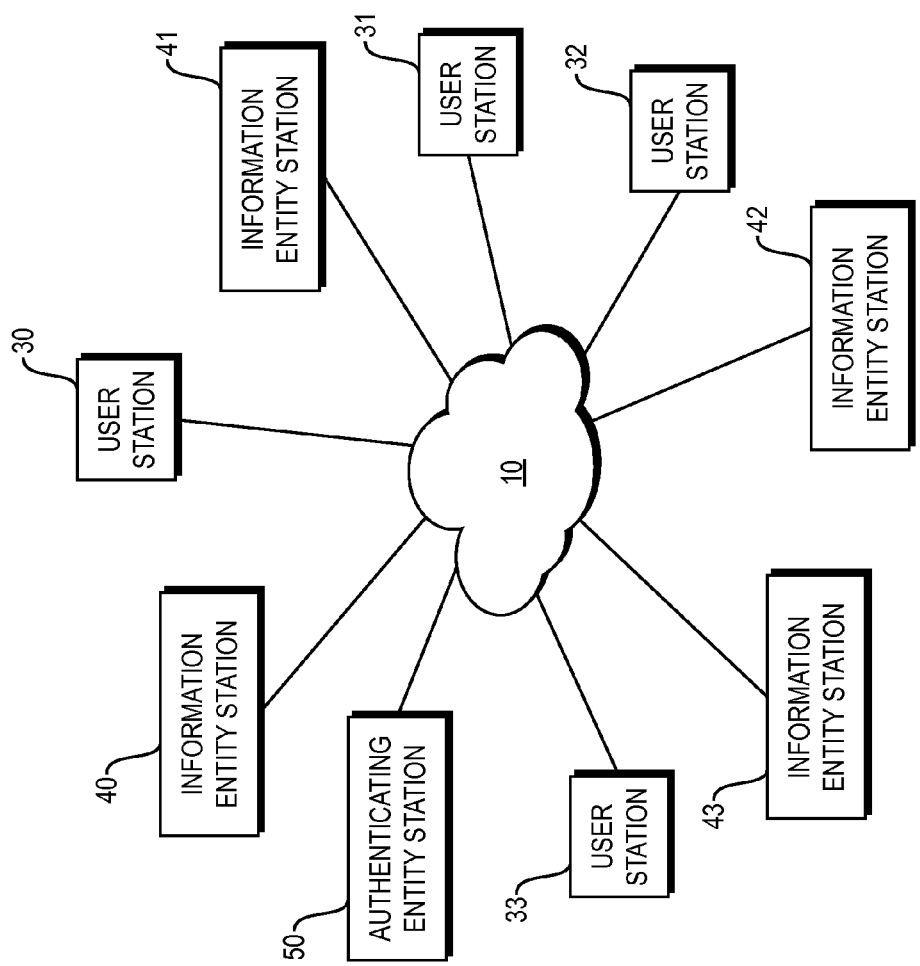
FIG. 1 depicts an exemplary network, including networked stations associated with user entities, information entities and an authenticating entity, in accordance with the present invention.

FIG. 1 illustrates a network 10, which could be the Internet or another public or private network. As shown, the network 10 includes multiple network stations interconnected so as to be capable of communicating with each other. These network stations include network stations 30-33 associated with respective individual user entities, network stations 40-43 associated with information entities, which could be any type entities having a presence, e.g. a web page, on network 10, such as merchants, banks, portals, sponsors, and/or distinguished entities etcetera, and a network station 50 associated with an authenticating entity known to and trusted by the information entities. It will be recognized that additional network stations of each type will typically be included in the network 10, and that the authenticating entity network station 50 could also serve as an information entity network station. It will also be recognized that information entities are sometime referred to as relying entities, since they are the entities that rely on the authentication of the authenticating entity.

Each of the user entity network stations 30-33 includes a network compatible device, such as a personal computer or other type of network device. Each of the information entity network stations 40-44 and authenticating entity network station 50 includes a network compatible device, which typically takes the form of a network server but could be of some other type. Accordingly, the information entity network stations 40-44 will sometimes be referred to as information entity servers, and the authenticating entity network station 50 will sometimes be referred to as an authenticating entity server. It should also be understood that the information entity network stations 40-44 and the authenticating entity network station 50 may include other devices, such as other computers, e.g. other servers with which the network device interacts to function in the manner described below.

The User Network Device

Figure 2:
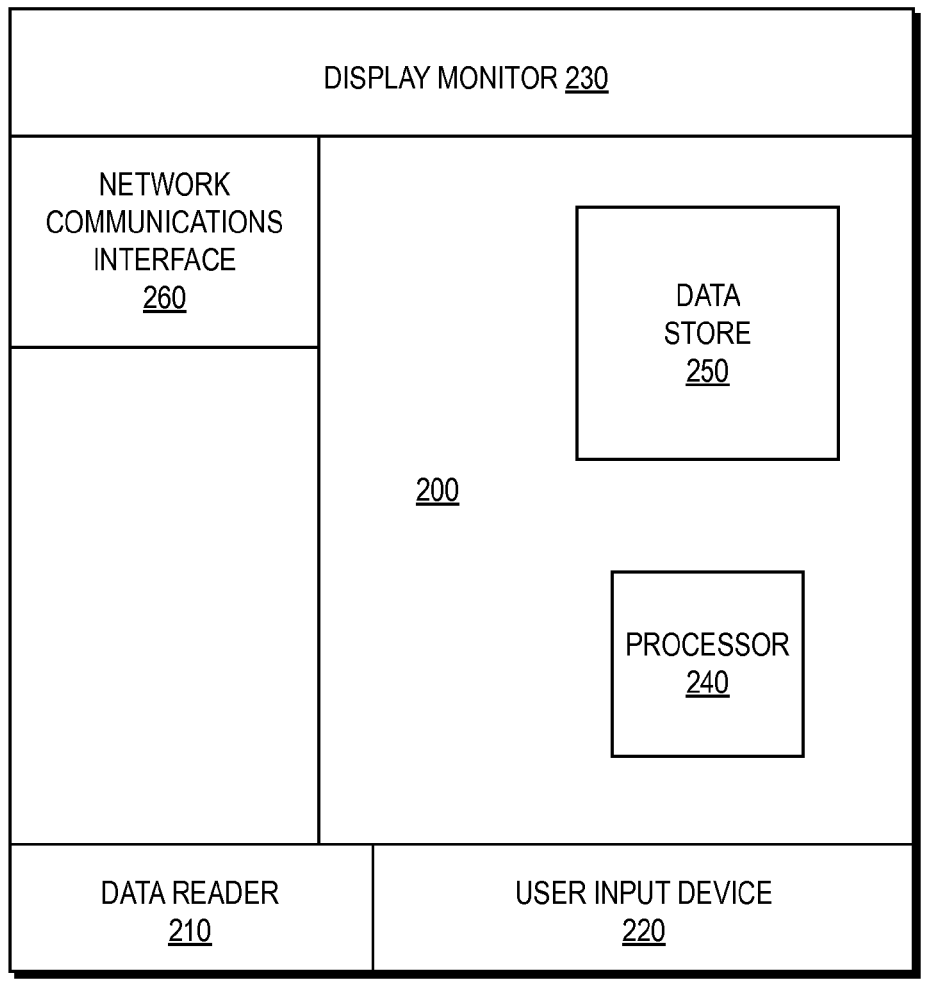
FIG. 2 depicts an exemplary block diagram of components of a network device suitable for use in a user entity network station shown in FIG. 1.

FIG. 2 depicts a simplified block of an exemplary personal computer (PC) 200 suitable for use by an individual user as a network device included in a user entity network station to access the network 10 and otherwise perform the functions described below. The PC is preferably a commercially available personal computer. It will be recognized that the PC configuration is exemplary, and that other components (not shown) could be added to or substituted for those depicted and certain of the depicted components could be eliminated if so desired. Further, each of the user entity network stations 30-33 could instead include another type device, i.e. a device other than a PC, such as, but not limited to, a personal digital assistant (PDA) or a mobile phone, e.g. cellular phone, or other type wireless communications device.

The PC or other type user entity network device functions in accordance with stored programmed instructions, which are sometimes characterized as logic, that are executed to drive its operation. Preferably, the device stores its programmed instructions in an internal data store, which could for example be an erasable programmable read only memory (EPROM), and/or hard disk. It will be recognized that only routine programming is required to implement the instructions required to drive the user network device to operate in accordance with the invention. Further, routine operations performed by depicted components will generally not be described, such operations being well understood in the art.

Referring to FIG. 2, the computer 200 includes a data reader 210 for loading programming or data from a floppy disk, compact disk (CD), or other removable media, onto the computer 200. The computer 200 also includes a user input device 220, such as a keyboard and/or mouse. A display monitor 230 is also provided to visually communicate, i.e. display, information to the user. The computer 200 has a main processor 240 that is interconnected via bus (not shown) with various remote and/or local data stores, which are depicted collectively as data store 250.

Data store 250 may include, but is not limited to, an EPROM, read only memory (ROM), random access memory (RAM), a hard drive with an associated hard disk, CD, floppy disk, a universal serial bus (USB) port for connecting a USB drive (often called a flash drive or memory), and/or a smart card reader for communicating with a smart card. The data store 250 might also include a trusted processing module (TPM) for securely storing cryptographic keys and/or other information, e.g. encrypted information.

As also shown, the computer 200 includes a network communications interface 260, for sending and receiving communication signals, commonly referred to as messages, over the network 10. The network communications interface 260 will typically include an I/O port and might also include a telephone, cable, satellite or other type modem. By accessing and executing the computer programming instructions, i.e. the logic, stored at the data store 250, the processor 240 is driven to operate in accordance with the present invention.

The Authenticating Entity Network Device

Figure 3:
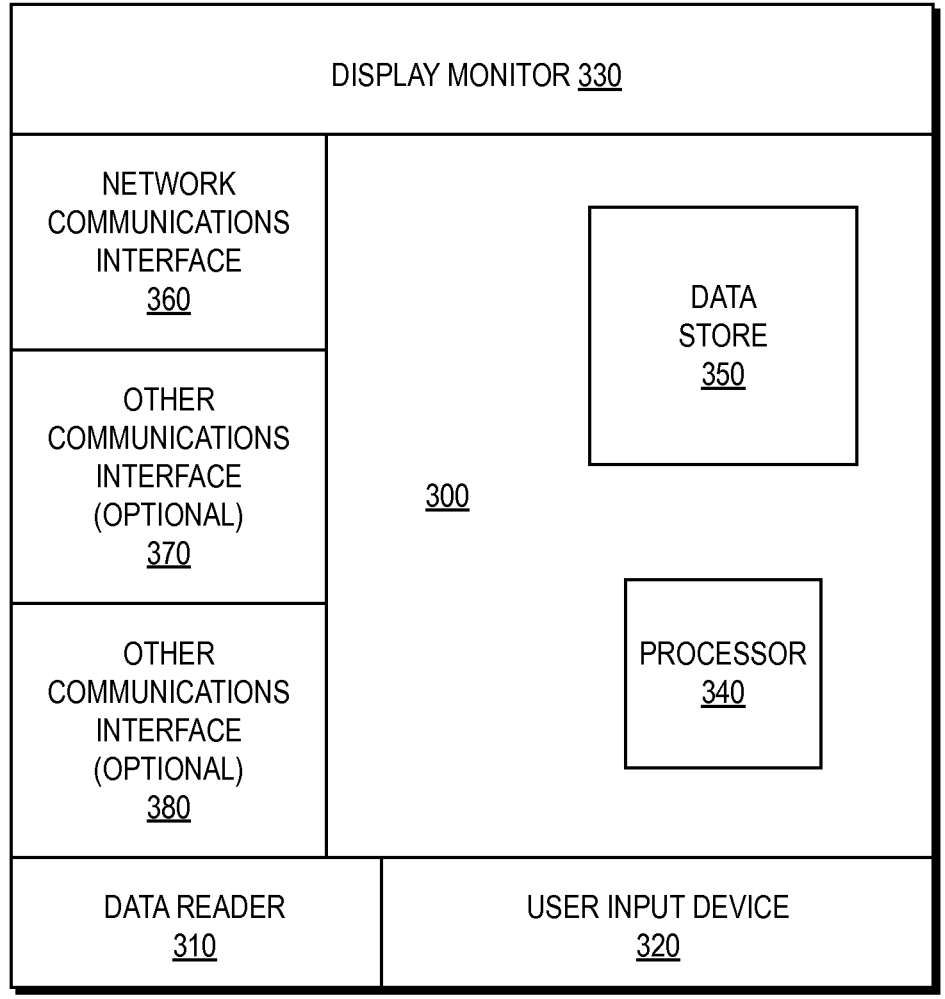
FIG. 3 depicts an exemplary block diagram of components of a network device suitable for use in an information entity network station and an authenticating entity network station shown in FIG. 1.

FIG. 3 depicts a simplified block of an exemplary network server 300 suitable for use as a network device in the an information entity network station 40-43 or authenticating entity network station 50 to access the network 10 and perform other functions described below. The server is preferably a commercially available personal or higher power computer. It will be recognized that the server configuration is exemplary, and that other components (not shown) could be added or substituted for those depicted and certain of the depicted components could be eliminated if so desired.

The server functions in accordance with stored programmed instructions, i.e. logic, that are executed to drive its operation. Preferably, the computer stores its programmed instructions in an internal data store, which could for example be an erasable programmable read only memory (EPROM), and/or hard disk. It will be recognized that only routine programming is required to implement the instructions required to drive the authenticating/information entity or authenticating gateway entity device to operate in accordance with the invention. Further, routine operations performed by depicted components will generally not be described, such operations being well understood in the art.

Referring to FIG. 3, the computer 300 includes a data reader 310 for loading programming or data from a floppy disk, compact disk (CD), or other removable media, onto the computer 300. The computer 300 also includes an operator input device 320, such as a keyboard and/or mouse. A display monitor 330 is also provided to visually communicate, i.e. display, information to the operator. The computer 300 has a main processor 340 that is interconnected via bus (not shown) with various remote and/or local data stores, which are depicted collectively as data store 350.

Data store 350 may include, but is not limited to, an EPROM, read only memory (ROM), random access memory (RAM), a hard drive with an associated hard disk, a CD, a floppy disk, a universal serial bus (USB) port for connecting a USB drive (often called a flash drive or memory), and/or a smart card reader for communicating with a smart card. The data store 350 might also include a trusted processing module (TPM) for securely storing cryptographic keys and/or other information, e.g. encrypted information.

As also shown, the computer 300 includes a network communications interface 360, for sending and receiving communication signals, commonly referred to as messages, over the network 10. The network communications interface 360 will typically include an I/O port and might also include a telephone, cable, satellite or other type of modem.

The computer 300 may optionally include a communications interface 370, for sending and receiving communication signals to and from an external authenticating entity (not shown) over a communications link outside the network 10. For example, it will be recognized that the authenticating server could, if desired, work with an external authenticating entity computing device (also not shown) to perform authentication in accordance with the present invention. If so, the external authenticating entity computing device may, if desired, be collocated with the authenticating entity network device as part of the authenticating entity network station, and the communications link might be via a cable connected to the communications interface 370. Alternatively, the external authenticating entity may be located at another network station within the network 10 or within a separate network (not shown). In the later case, the communications link might be via a separate network, such as the public switch telephone network, to which the communications interface 370 can be interconnected. The network communications interface 370 will typically include an I/O port and might also include a telephone, cable, satellite or other type modem.

The computer 300 may optionally include a communications interface 380, for sending and receiving communication signals to and from still another entity, over a communications link outside the network 10. The network communications interface 380 will typically include an I/O port and might also include a telephone, cable, satellite or other type modem.

By accessing and executing the computer programming instructions, i.e. the logic, stored at the data store 350, the processor 340 is driven to operate in accordance with the present invention.

Optional Authentication and Session Key Distribution

Figure 4:
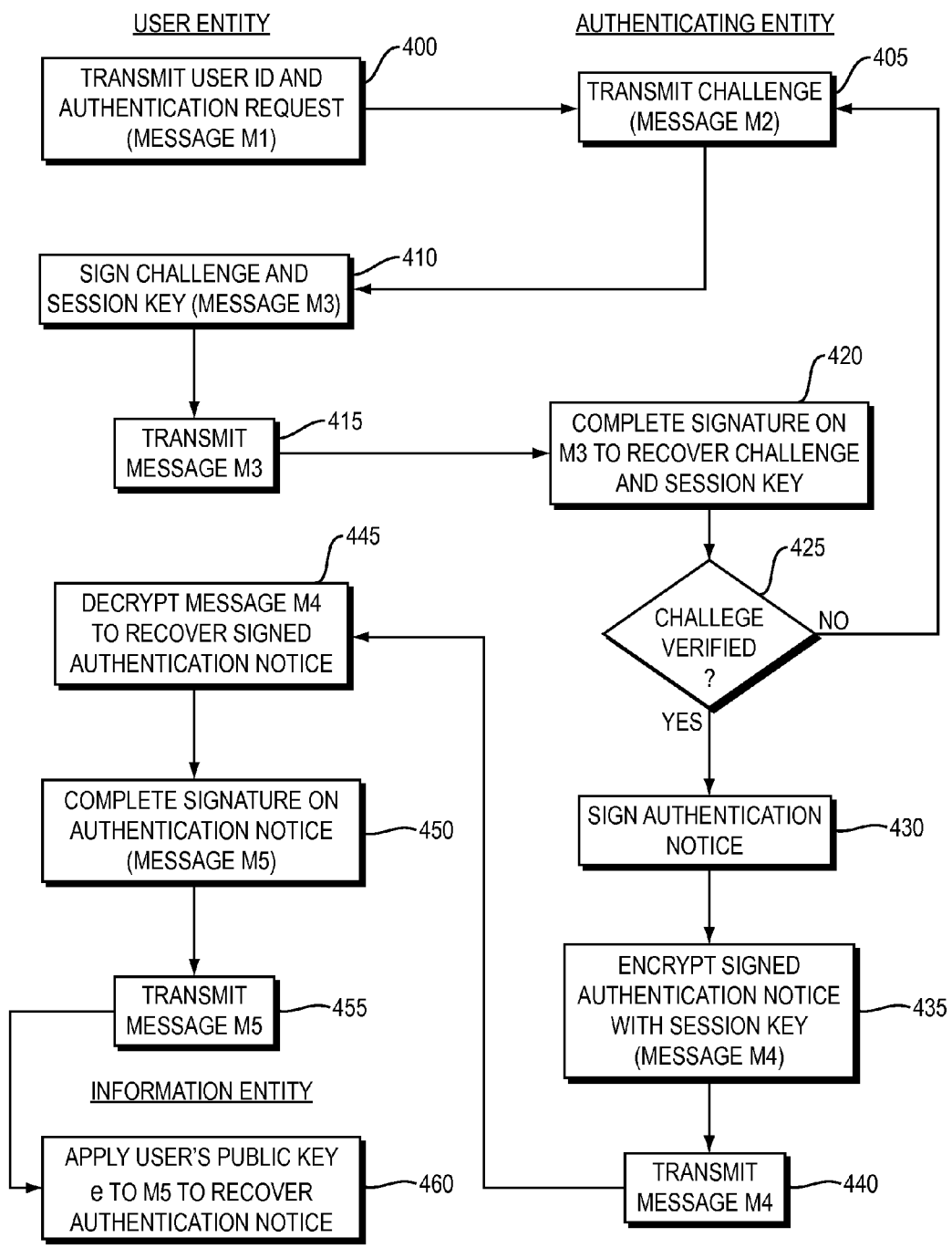
FIG. 4 depicts operations of networked stations shown in FIG. 1, to optionally perform primary authentication and session key distribution.

Although optional with respect to the present invention, preferably the one-time-password (OTP) authentication is performed after a primary authentication of the user entity and the establishment of a secure channel for communications, e.g. via distribution of a symmetric session crypto-key which can be used to encrypt communications during the session. FIG. 4 is a simplified exemplary depiction of a preferred protocol for performing a primary authentication of the user entity and establishing a secure channel for communications. It should be noted that many of the related applications identified above, including U.S. application Ser. No. 11/704,912, filed Feb 12, 2007, now issued as U.S. Pat. No. 7,886,346 on Feb. 8, 2011 and entitled "FLEXIBLE AND ADJUSTABLE AUTHENTICATION IN CYBERSPACE", U.S. application Ser. No. 11/415,065, filed May 2, 2006, now issued as U.S. Pat. No. 7,840,993 on Nov. 23, 2010 and entitled "PROTECTING ONE-TIME-PASSWORDS AGAINST MAN-IN-THE-MIDDLE ATTACKS", U.S. application Ser. No. 11/055,987, filed Feb. 14, 2005, and entitled "ARCHITECTURE FOR ASYMMETRIC CRYPTO-KEY STORAGE", and U.S. application Ser. No. 09/739,260, filed Dec. 19, 2000, now issued as U.S. Pat. No. 6,970,562 on Nov. 29, 2005 and entitled "SYSTEM AND METHOD FOR CRYPTO-KEY GENERATION AND USE IN CRYPTOSYSTEM"), all of which are assigned to the assignee of rights in the present application, provide a more detailed description of the use of split asymmetric cryptography to perform primary authentication and establish a secure channel for communications. It will be recognized that the authenticating server may sometimes be referred to as the TriCipher Armored Credential (TAC) appliance in the related applications. It should also be understood that techniques, other than those disclosed in the referenced applications or described below, could be used for primary authentication and establishment of a secure channel for session communications, if so desired. For example, although, as disclosed in the referenced applications and described below, split key RSA asymmetric key cryptography is preferably used for primary authentication and establishment of a secure channel, other forms of cryptography, including but not limited to other forms of asymmetric key cryptography could be utilized.

Turning again to FIG. 4, each user entity is associated with a split asymmetric crypto-key having a public key e and a private key d. The private key d is split into a first private key portion d1, which is known only to the user entity, and a second private key portion d2, which is known only to the authenticating entity. As disclosed in the related applications identified above, the first private key portion d1 is preferably assembled on the user network device from one or more factors, typically including the user entity's password, and is therefore never persistently stored for long periods on the user network device.

As shown in FIG. 4, in step 400 the user entity, e.g. represented by user entity network station 30, transmits, via the communications interface 260, a first message including the user entity identifier (ID) to an authenticating entity, e.g. represented by authenticating entity network station 50, over the network 10. For example, after the user entity network station 30 has sought access to certain information at an information entity network station, e.g. information entity network station 40, the processor 340 of the information entity network device may redirect the user entity network station 30 to the authenticating entity network device 40 for authentication prior to allowing access. After being redirected to the network site of the authenticating entity network station 50, a message M1, including the user's ID (UID) and a request for authentication, which could in turn include a challenge received from the information entity network device in response to the user seeking access, might be transmitted over the network 10 via the communications interface 260 of the user entity network station 30, to the authenticating entity network station 50, e.g. M1=[request authentication, UID]. Optionally this may be deferred until after step 415 so it can be sent encrypted with the symmetric key. It should be recognized that messages are transmitted via the communications interface 260 at the direction of the processor 240 of the user entity network station, and messages are transmitted via the communications interface 360 at the direction of the processor 340 of the authenticating entity network station.

In step 405, the authenticating entity network station 50 transmits, over the network 10 via the communications interface 360 of the authenticating entity network station 50, a message M2 having a authenticating entity challenge to the user entity network station 30, via the network 10, e.g. M2=[challenge]. It is perhaps worthwhile to highlight hear that the authenticating entity challenge should not be confused with an information entity challenge that, as discussed above, might be included in the authentication request that the user transmits to the authenticating entity.

In step 410, the communications interface 260 of the user entity network station 30 receives the transmitted message M2. The processor 240 of the user entity network station 30 signs the challenge in received message M2 and at least part of a symmetric session key, in this case a symmetric session key SK, with the user entity's portion of the split private key, i.e. with the first private key portion d1, e.g. sign (challenge, SK) d1. As will be understood, the symmetric session key SK is a random value. In step 415, at the direction of the processor 240, the communications interface 260 of the user entity network station 30 transmits a message M3, having the signed challenge and the symmetric session key SK, to the authenticating entity network station 50, via the network 10, e.g. M3=[sign (challenge, SK) d1].

In step 420, the communications interface 360 of the authenticating entity network station 50 receives transmitted message M3. The processor 340 of the authenticating entity network station 50 recovers the challenge and the symmetric session key SK by completing the signature on transmitted message M3 with the authenticating entity's portion of the split private key, i.e. with the second private key portion d2, and the public key e, e.g. sign (M3) d2, e=challenge, SK. In step 425, the processor 340 of the authenticating entity network station 50 verifies the recovered challenge to authenticate the user entity. In step 430, the processor 340 of the authenticating entity network station 50 signs an authentication notice, which is most commonly the received authentication request or an information entity challenge included in the request for authentication, with the authenticating entity's portion of the split private key, i.e. with the second private key portion d2. In step 435, the processor 340 of the authenticating entity network station 50 encrypts the signed authentication notice with the symmetric session key SK, e.g. encrypt [sign (authentication notice) d2] SK. In step 440, at the direction of the processor 340, the communications interface 360 of the authenticating entity network station 50 transmits a message M4, having the encrypted signed authentication notice, to the user entity network station 30, via the network 10, e.g. M4=encrypt [sign (authentication notice) d2] SK.

In step 445, the communications interface 260 of the user entity network station 30 receives the transmitted message M4, and the processor 240 of the user entity network station 30 recovers the signed authentication notice, e.g. sign (authentication notice) d2, by decrypting transmitted message M4 with the symmetric session key SK, e.g. decrypt (M4) SK=sign (authentication notice) d2. In step 450, the processor 240 of the user entity network device 30, further signs the signed authentication notice with the user entity's portion of the split private key, i.e. with the first private key portion d1. In step 455, at the direction of the processor 240, the communications interface 260 of the user entity network station 30 transmits a message M5, having the further signed authentication notice to the information entity network station 40, via the network 10, e.g. M5=sign [sign (authentication notice) d1] d2. In step 460, communications interface 360 of the information entity network station 40 receives the transmitted message M5 and the processor 340 recovers the authentication notice by completing the signature on transmitted M6, e.g. sign (M6) e=authentication notice.

If verification of the recovered challenge by the authenticating entity network station 50 in step 425 fails, the authentication fails. Further, while as described above, a shared symmetric key SK is established in conjunction with the authentication, it should be understood that this is not mandatory. Accordingly, the session key distribution need not be provided in conjunction with the authentication protocol, unless so desired. Furthermore, if desired the described protocol can be augmented to set up a mutually authenticated session key by transmitting only one part of the symmetric session key from each entity, and then combining the respectively transmitted parts to form a shared symmetric session key that can be used to secure later communications during the session. Additionally, it will be recognized that once the secure channel is established, via the distributed session key, above described authentication could, if desired, be supplemented with some type of secondary authentication. For example, the secure channel could also be used to secondarily authenticate the user entity based on knowledge of a one-time-password (OTP). Further information regarding the use of the secure channel for secondary authentication can be found, for example, in related U.S. application Ser. No. 11/415,065, filed May 2, 2006, now issued as U.S. Pat. No. 7,840,993 on Nov. 23, 2010, and entitled "PROTECTING ONE-TIME-PASSWORDS AGAINST MAN-IN-THE-MIDDLE ATTACKS".

Applications Executing on the User Entity Network Station

Figure 5:
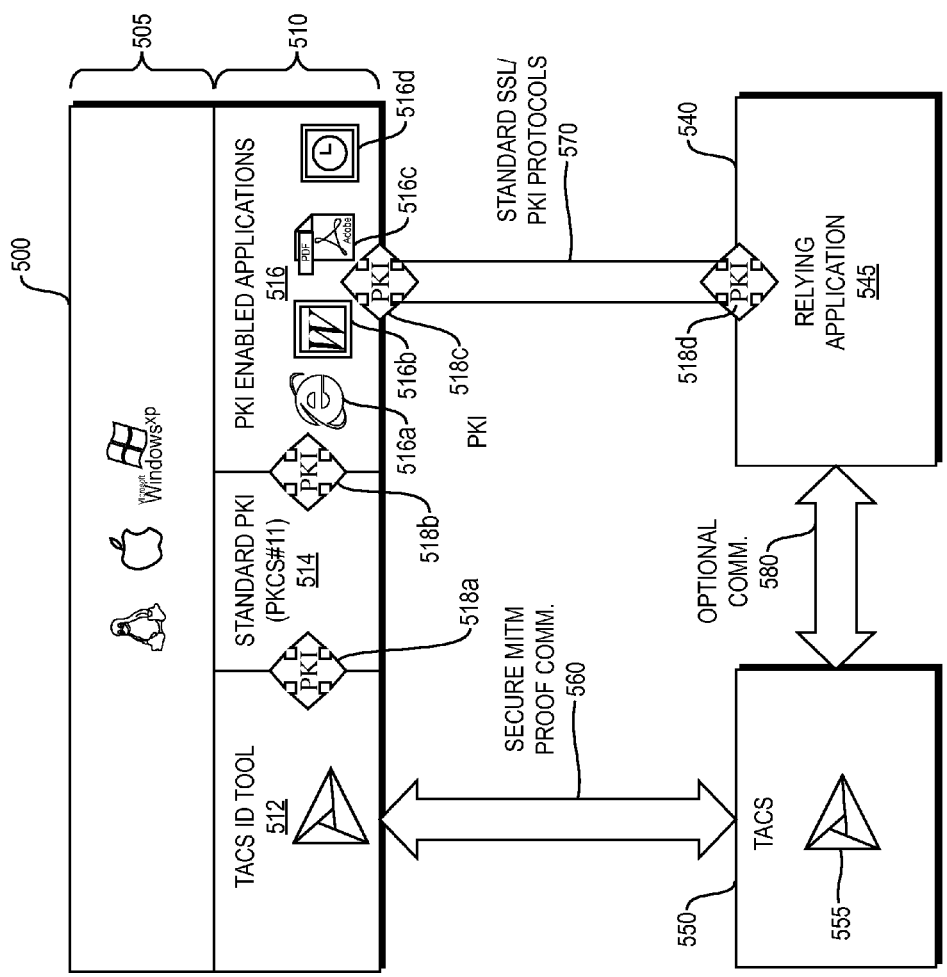
FIG. 5 depicts the interfacing between certain applications that may be executing on the user entity network station and the linking of networked stations associated with a user entity, information entity and an authenticating entity, in accordance with aspects of the present invention.

FIG. 5 depicts the interfacing between certain applications that may be executing on the user entity network station and the linking of networked stations associated with a user entity, information entity and an authenticating entity. More particularly, as shown in FIG. 5 the user entity network station, e.g. user entity network station 30, is a desktop computer 500, which includes the components of the personal computer 200 shown in FIG. 2. The authenticating entity network station, e.g. authenticating entity network station 50, is a server computer 550, which includes the components of the computer 300 shown in FIG. 3. The information entity network station, e.g. information entity network station 40, is a server computer 540, which also includes the components of the computer 300 shown in FIG. 3.

As shown, the desktop computer 500 includes operating system software 505, such as Windows.™., Apple.™., Linux.™. or some other type of operating system software. Also included are various applications 510. The applications 510, include what we sometime characterize as an ID Tool application 512, a standard public key infrastructure (PKI) application 514, such as CAPI or PKCS#11 which are typically included with off-the-shelf-operating system software, and an exemplary set of PKI enabled applications 516. As shown, the exemplary set of PKI enabled applications 516 include a browser application 516a, shown as Microsoft Internet Explorer.™., a word processing application 516b, shown as Microsoft Word.™., an imaging application 516c, shown as Adobe PDF.™., and an email application 516d, shown as Microsoft Outlook.™. However, it should be understood that alternative or additional PKI enabled applications could be included on the desktop computer 500. A standard PKI infrastructure interface 518a is provided between the ID Tool application 512 and the standard PKI application 514, a standard PKI infrastructure interface 518b is provided between the standard PKI application 514 and each of the PKI enabled applications 516, and standard PKI infrastructure interface 518c and 518d are provided between each of the PKI enabled applications 516 and a relying application 545 executing on the information entity network server 540.

The operating system software 505 and the various applications 510 are stored in the date store 250, perhaps after being read by the data reader 210, and are executed by the processor 240. As noted above, communications are received by and sent from the desktop computer 500 via the network communications interface 260. The processor 240, executing the operating system software 505, the ID Tool application 512, the standard PKI application 514, and at least one of the PKI enabled applications 516, e.g. the browser application 516a, can operate as has been described above to direct the interaction with the authenticating entity server 550 and the information entity server 540, so as to perform the authentication and session key distribution, including the signatures and cryptography, previously described with reference to FIG. 4.

Communications are received by and sent from the authenticating entity server 550 via the network communications interface 360. The processor 340 of the authenticating entity server 550, by executing server operating system software (not shown) and the security application 555, which is preferably the TriCipher Armored Credential System (TACS) application, can operate as has been described above to direct the interaction with the user desktop computer 500, so as to perform the authentication and session key distribution, including the signatures and cryptography, previously described with reference to FIG. 4.

Communications are also received by and sent from the information entity server 540 via its network communications interface 360. The processor 340 of the information entity server 540, by executing server operating system software (not shown) and the relying application 545, can operate as has been described above to direct the interaction with the user desktop computer 500, so as to perform the authentication previously described with reference to FIG. 4.

As also shown in FIG. 5, communications between the authenticating entity server 550 and the user desktop computer 500 are via a network communication channel 560, and communications between the information entity server 540 and the user desktop computer 500 are via a network communication channel 570. These channels might also be correctly characterized as network communications links. It should be understood that, after distribution of session key, communication channel 560 is a secure channel, with all communications between the desktop computer 500 and the authenticating entity server 550 being authenticated and/or encrypted using the symmetric session key. However, it should be understood that the channel 560 could be secured in some other manner. For example, communications via channel 560 could be authenticated and/or encrypted using an asymmetric key, rather than a symmetric session key, if so desired. Network communication channel 570 may be a secure or an insecure channel, depending on the implementation. However, it will be recognized that today, communications channels established over the Internet are often insecure.

Optionally, a network or non-network communications channel or link 580 is also established between the authenticating entity server 550 and the information entity server 540. If, for example, the authenticating entity server 550 and the information entity server 540 are co-located at the same network station, the communications channel 580 will typically be a non-network communications channel. However, it could be otherwise. Furthermore, even if the authenticating entity server 550 and the information entity server 540 are not co-located, the communications channel 580 could be a non-network communications channel. For example, if the network is the Internet, the channel 580 could be a channel established over the public switch telephone network or a private network. Whether the communications channel 580 is a network or non-network communications channel, if such a channel is utilized it will preferably be a secure communications channel.

Enhanced Communication Security

Figure 6:
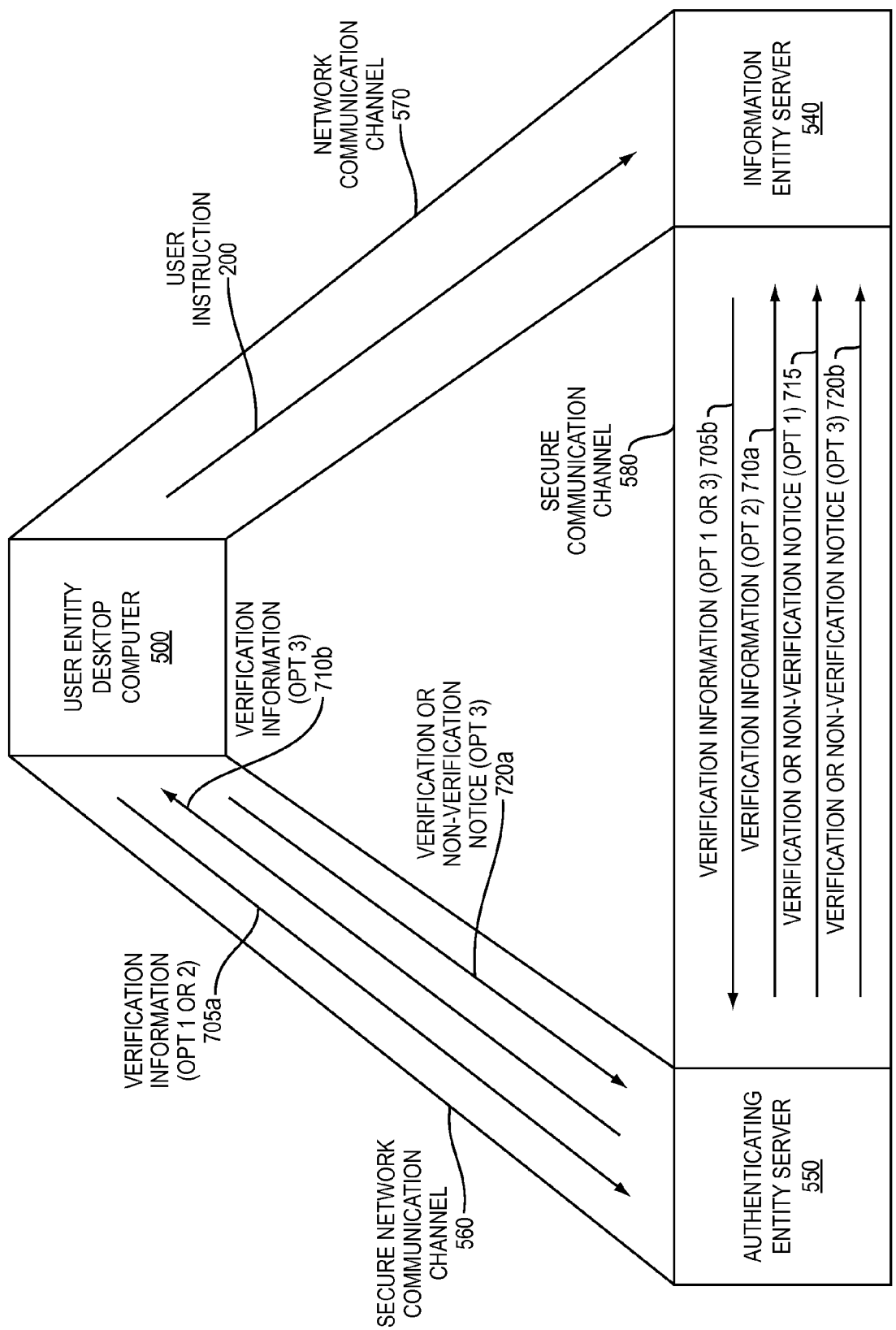
FIG. 6 is a flow diagram depicting the operations of the networked stations shown in FIG. 5 to protect communications of the user entity to the information entity, in accordance with other aspects of the present invention.

FIG. 6 is a flow diagram depicting the operations of the user entity desktop computer (UEDC) 500, the authenticating entity server (AES) 550, and the information or relying entity server (IES) 540 shown in FIG. 5, and more particularly the TACS application 555 executing on the AES 550 and the ID Tool application (IDTA) 512 executing on the UEDC 500 and the relying application (RA) 545 executing on the IES 540 to reliably confirm information, such as transactional or administrative information, e.g. an instruction to buy or sell goods or services or to change a user ID, communicated by the user entity to the information entity, and thereby enhance the security of these communications. This technique is particularly beneficial in protecting against phishing and other man-in-the-middle (MITM) attacks and pharming attacks.

For purposes of the description below, it is assumed that the authenticating entity has already authenticated the user entity to the information entity, and that the network communication channel 560 has already been secured. For example, the authentication of the user entity and securing of channel 560 could have been performed as described with reference to FIG. 4. It is also assumed that the communication channel 580 between the AES 550 and IES 540 is a secure channel. Referring again to FIG. 6, in step 700 the IBA 516a executing on the UEDC 500 directs, based on a user input, an instruction to the information entity represented by the IES 540 via the network communication channel 570. The processing and communications may proceeds in various ways, noted in FIG. 6 as options (OPT) 1-3, to implement the enhanced security.

Next, if proceeding in accordance with either option 1 or option 2, in step 705a the IDTA 512 also directs verification information corresponding to the user instruction to a trusted entity, over the network via the preferably secure network communication channel 560. In the implementation being described, the trusted entity is the authenticating entity represented by AES 550, although it could be another type of trusted entity.

If the user has an associated asymmetric crypto-key pair including a private key d and a public key e, with the private key d being split into a first private key portion d1 and a second private key portion d2, it is most preferable for the IDTA 512 executing on the UEDC 500 to sign the verification information with the first private key portion d1 prior to directing it to the trusted entity. If such a case, the TACS 555 executing on the AES 550 further signs the received verification information with the second private key portion d2 to both authenticate and recover the verification information.

If proceeding in accordance with either option 1 or option 3, in step 705b the RA 545 directs verification information corresponding to the user instruction received from the UEDC 500 to the trusted entity via the preferably secure communication channel 580. It should be understood that the verification information directed by the IDTA 512 and/or the RA 545 could be the user instruction itself, although this is not required.

Proceeding with Option 1

If, in accordance with option 1, the IDTA 512 directs verification information to AES 550 in step 705a and the RA 545 directs verification information to AES 550 in step 705b, the TACS 555 executing on the AES 550 verifies the verification information received from the IES 540 in step 705b based on the verification information received from the UEDC 500 in step 705a, to thereby confirm that the user instruction received by the IES 540 was the user instruction intended to by sent by the UEDC 500 in step 700. Verification may be performed in various ways. For example, verification might be performed by comparing the verification information from user entity with that received from the information entity.

If the user has an associated asymmetric crypto-key pair, e.g. an RSA or other type asymmetric crypto-key pair, including a private key d and a public key e, with the private key d being split into a first private key portion d1 and a second private key portion d2, most preferably the IDTA 512 executing on the UEDC 500 signs the verification information with the first private key portion d1 before directing it to the trusted entity. If such a case, the TACS 555 executing on the AES 550 further signs the received verification information with the second private key portion d2 to both authenticate and recover the verification information.

Preferably, if the verification information, and hence the user instruction received by the IES 540, is verified, in step 715 the TACS 555 directs a verification notice to the relying entity via the secure communication channel 580. However, if the verification information, and hence the user instruction received by the IES 540, cannot be verified, in step 715 the TACS 555 directs a non-verification notice to the relying entity via the secure communication channel 580.

If RA 545 executing on the IES 540 receives a verification notice, the IES 540 proceeds with the received user instruction. However, if the RA 545 receives a non-verification notice, the IES 540 will not proceed with the received user instruction. In this later case, the RA 545 may take various actions. For example, the RA 545 may direct a warning (not shown) to the user either via network communication channel 570, or to the authenticating entity via the secure communication channel 580 for passing on to the user or may terminate the session with the user.

Proceeding with Option 2

If, in accordance with option 2, the IDTA 512 directs the verification information to AES 550, in step 710*a* the TACS 555 directs the verification information received from the UEDC 500 in step 705*a*, optionally after recovering the verification information by applying d2, to the relying entity via the secure communication channel 580, and RA 545 executing on the IES 540 verifies the user instruction received from the UEDC 500 in step 700 based on the verification information received from the AES 550 in step 710*a*. Verification may be performed in various ways. For example, verification might be performed by comparing the received user instruction with the received verification information.

If the RA 545 executing on the IES 540 verifies the received user instruction, the IES 540 proceeds with the instruction. However, if the RA 545 is unable to verify the received user instruction based on the received verification information, the IES 540 will not proceed with the user instruction. In this later case, the RA 545 may take various actions, such as those described above to direct a warning (not shown) to the user or terminate the session with the user.

Proceeding with Option 3

If, in accordance with option 3, the RA 545 directs verification information to AES 550 in step 705*b*, in step 710*b* the TACS 555 directs the verification information received from the IES 540 in step 705*b* to the user entity via the secure network communication channel 560. The IDTA 512 executing on the UEDC 500 verifies the user instruction based on the verification information received from the AES 550 in step 710*b*.

If the user has an associated asymmetric crypto-key pair, e.g. an RSA or other type asymmetric crypto-key pair, including a private key d and a public key e, with the private key d being split into a first private key portion d1 and a second private key portion d2, most preferably the TACS 555 executing on the AES 550 signs the received verification information with the second private key portion d2 before directing it to the user entity. If such a case, the IDTA 512 executing on the UEDC 500 further signs the received verification information with the first private key portion d1 to both authenticate and recover the verification information.

Verification of the user instruction by the IDTA 512 executing on the UEDC 500 may, for example, be performed by the IDTA 512 causing the IBA 516*a* to display the verification information received from the AES 550 in step in step 705*b*, which as noted above could be the user instruction itself that was received by the IES 540, and to receive an input of the user validating the displayed verification information. Alternatively, verification could be performed by the IDTA 512 by performing a comparison of a stored copy of the user instruction with the received verification information in an automated manner, and without display or input from the user.

Preferably, if the verification information, and hence the user instruction received by the IES 540, is verified, in step 720*a* the IDTA 512 executing on the UEDC 500 directs a verification notice to the trusted entity via the secure network communication channel 560, and in step 720*b* the TACS 555 executing on the AES 550 directs the verification notice to the relying entity via the secure communication channel 580. On the other hand, if the verification information, and hence the user instruction received by the IES 540, cannot be verified, in step 720*a* the IDTA 512 executing on the UEDC 500 directs a non-verification notice to the trusted entity via the secure network communication channel 560, and in step 720*b* the TACS 555 executing on the AES 550 directs the non-verification notice to the relying entity via the secure communication channel 580.

If RA 545 executing on the IES 540 receives a verification notice, the IES 540 proceeds with the received user instruction. However, if the RA 545 receives a non-verification notice, the IES 540 will not proceed with the received user instruction. In this later case, the RA 545 may take various actions, such as those described above to direct a warning (not shown) to the user 2 or terminate the session with the user.

Thus, depending on the option implemented, the verification of the user instruction can take place at the UEDC 500, the IES 540 or the AES 550. Notwithstanding where the verification takes place, the verification information that is communicated to the verifying entity is communicated over only one or more secure channels, i.e. over secure network communication channel 560 and/or secure network or non-network communication channel 580.

As noted above, a preferred technique for securing communication channel is by using a challenge-response authentication and session key exchange protocol of the type described above with reference to steps 405-425 of FIG. 4. As indicated in later steps shown in FIG. 4, using the preferred technique the established network communication channel 560 is secured by encrypting the communication, here the verification information communicated between the AES 550 and the UEDC 500, with the exchanged symmetric session key. However, other techniques could be used to secure the channel if so desired. The verification information communicated between the AES 550 and the IES 540 could similarly be secured by encrypting, e.g. using a session crypto-key, or by some other technique.

As described above, the present invention enhances the security of communications over a network. It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. in providing security for network communications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A computer implemented method for verifying instructions communicated from a user to a relying entity, the method comprising:
  receiving, by a trusted entity, that is independent of the relying entity, a request from the relying entity to verify the instructions received by the relying entity from the user wherein the request includes a first set of verification information corresponding to the instructions communicated to the relying entity from the user;
  sending, by the trusted entity, a request to the user to provide a second set of verification information corresponding to the instructions communicated to the relying entity from the user;
  receiving, by the trusted entity, the verification information from the user, wherein the second set of verification information includes an encrypted form of the first set of verification information;
  comparing, by the trusted entity, the first set of verification information received from the relying entity with the second set of verification information received from the user; and
  verifying, by the trusted entity computing device, the instructions based on the comparing.

2. The computer implemented method of claim 1, further comprising: decrypting, by the trusted entity, the encrypted form of the first set of verification information; and
  comparing, by the trusted entity, the first set of verification information received from the relying entity with the decrypted first set of verification information.

3. The computer implemented method of claim 1 wherein the instructions received by the relying entity from the user include a task to be performed by the relying entity.

4. The computer implemented method of claim 1, further comprising: communicating a verification notice to the relying entity if the received instructions are able to be verified by the trusted entity or communicating a non-verification notice to the relying entity if the received instructions are unable to be verified by the trusted entity.

5. The method of claim 1, wherein the communications between the user, the trusted entity, and the relying entity are transmitted on a secure channel.

6. The method of claim 1, further comprising authenticating, or encrypting, or both authenticating and encrypting communications transmitted between the user, the trusted entity, and the relying entity.

7. A system comprising:
  a relying entity; and
  a trusted entity comprising one or more processors configured to:
    receive a request from the relying entity to verify the instructions received by the relying entity from the user wherein the request includes a first set of verification information corresponding to the instructions communicated to the relying entity from the user;
    send a request to the user to provide a second set of verification information corresponding to the instructions communicated to the relying entity from the user;
    receive the second set of verification information from the user, wherein the second set of verification information includes an encrypted form of the first set of verification information;
    compare the first set of verification information received from the relying entity with the second set of verification information received from the user; and
    verify the instructions based on the comparing.

8. The system of claim 7 wherein the instructions received by the relying entity from the user include a task to be performed by the relying entity.

9. The system of claim 7, wherein the processor is further configured to direct transmission of a verification notice to the relying entity or direct transmission of a non-verification notice to the relying entity based on the comparing.

10. The system of claim 7, wherein the processor is further configured to transmit communications between the user, the authentication entity, and the relying entity on a secured channel.

11. The system of claim 7, wherein the processor is further configured to authenticate, or encrypt, or both authenticate and encrypt communications transmitted between the user, the authentication entity, and the relying entity.

12. A non-transitory, machine-readable storage medium embodying computer software, the computer software causing a computer to perform a method for verifying instructions communicated by a user over a communications network to a relying entity, the method comprising:
  receiving, by a trusted entity that is independent from the relying entity, a request from the relying entity to verify the instructions received by the relying entity from the user wherein the request includes a first set of verification information corresponding to the instructions communicated to the relying entity from the user;
  sending a request to the user to provide verification information corresponding to the instructions communicated to the relying entity from the user;
  receiving the second set of verification information from the user, wherein the second set of verification information includes an encrypted form of the first set of verification information;
  comparing the first set of verification information received from the relying entity with the second set of verification information received from the user; and
  verifying the instructions based on the comparing.

13. The non-transitory, computer-readable storage medium of claim 12 wherein the instructions includes a task to be performed by the relying entity.

14. The non-transitory, machine-readable storage medium of claim 12, wherein a verification notice is sent to the relying entity, wherein, the verification notice includes a confirmation that the instructions received by the relying entity is the instructions sent by the user.

15. The non-transitory, machine-readable storage medium of claim 12, wherein the communications between the user, the trusted entity, and the relying entity are transmitted on a secure channel.

16. The non-transitory, machine-readable storage medium of claim 12, wherein communications transmitted between the user, the trusted entity, and the relying entity are authenticated, or encrypted, or both authenticated and encrypted.

* * * * *